US008589405B1

(12) United States Patent
Estan

(10) Patent No.: US 8,589,405 B1
(45) Date of Patent: Nov. 19, 2013

(54) TOKEN STITCHER FOR A CONTENT SEARCH SYSTEM HAVING PIPELINED ENGINES

(75) Inventor: Cristian Estan, Sunnyvale, CA (US)

(73) Assignee: NetLogic Microsystems, Inc., Irvine, CA (US)

(*) Notice: Subject to any disclaimer, the term of this patent is extended or adjusted under 35 U.S.C. 154(b) by 123 days.

(21) Appl. No.: 12/885,176

(22) Filed: Sep. 17, 2010

Related U.S. Application Data

(63) Continuation-in-part of application No. 12/838,323, filed on Jul. 16, 2010.

(51) Int. Cl.
*G06F 7/00* (2006.01)
*G06F 17/30* (2006.01)

(52) U.S. Cl.
CPC .. *G06F 17/30542* (2013.01); *G06F 2221/0711* (2013.01)
USPC ............................ 707/745; 707/758; 707/780

(58) Field of Classification Search
CPC ................... G06F 17/30542; G06F 2221/0711
USPC .................................. 707/706, 745, 758, 780
See application file for complete search history.

(56) References Cited

U.S. PATENT DOCUMENTS

| | | | |
|---|---|---|---|
| 5,051,947 A | 9/1991 | Messenger et al. | |
| 6,785,677 B1 | 8/2004 | Fritchman | |
| 7,188,168 B1 * | 3/2007 | Liao | 709/224 |
| 7,225,188 B1 * | 5/2007 | Gai et al. | 707/999.003 |
| 7,280,541 B2 | 10/2007 | Relan | |
| 7,308,561 B2 | 12/2007 | Cornet et al. | |
| 7,353,332 B2 | 4/2008 | Miller et al. | |
| 7,440,304 B1 | 10/2008 | Raj | |
| 7,512,634 B2 * | 3/2009 | McMillen | 707/999.103 |
| 7,529,746 B2 | 5/2009 | Ichiriu et al. | |
| 7,539,031 B2 | 5/2009 | Ninan et al. | |
| 7,539,032 B2 | 5/2009 | Ichiriu et al. | |
| 7,624,105 B2 | 11/2009 | Ichiriu et al. | |
| 7,634,500 B1 | 12/2009 | Raj | |
| 7,643,353 B1 | 1/2010 | Srinivasan et al. | |
| 7,644,080 B2 | 1/2010 | Mammen et al. | |
| 7,656,716 B1 | 2/2010 | Srinivasan et al. | |
| 7,660,140 B1 | 2/2010 | Joshi et al. | |
| 7,710,988 B1 | 5/2010 | Tripathi et al. | |
| 7,756,885 B2 | 7/2010 | Norton et al. | |
| 7,783,654 B1 | 8/2010 | Sreenath | |
| 7,787,275 B1 | 8/2010 | Birman et al. | |
| 7,826,242 B2 | 11/2010 | Joshi et al. | |
| 7,859,877 B2 | 12/2010 | Mondaeev | |
| 7,872,890 B1 | 1/2011 | Starovoytov | 365/49.17 |

(Continued)

*Primary Examiner* — Phong Nguyen
(74) *Attorney, Agent, or Firm* — Sterne, Kessler, Goldstein & Fox P.L.L.C.

(57) ABSTRACT

A content search system includes multiple pipelined search engines that implement different portions of a regular expression search operation. For some embodiments, the search pipeline includes a DFA engine, an NFA engine, and a token stitcher that combines partial match results generated by the DFA and NFA engines. The token stitcher can be configured to implement unbounded sub-expressions without utilizing resources of the DFA or NFA engines. A token stitcher may comprise an input line for receiving tokens that indicate a partial match between an input string and a regular expression, a flag bank that stores flags which, when activated, identify one or more of the sub-expressions that match the input string, a program memory that stores programs that each comprises instructions for processing tokens, and an engine configured to identify programs that are associated with a newly received token.

30 Claims, 10 Drawing Sheets

(56) References Cited

U.S. PATENT DOCUMENTS

| | | |
|---|---|---|
| 7,876,590 B2 | 1/2011 | Joshi et al. ............... 365/49.17 |
| 7,889,727 B2 | 2/2011 | Miller et al. |
| 7,916,510 B1 | 3/2011 | Starovoitov et al. ......... 365/49.1 |
| 8,015,208 B2 * | 9/2011 | McMillen .................... 707/791 |
| 8,051,085 B1 | 11/2011 | Srinivasan et al. ........... 707/737 |
| 2004/0225999 A1 | 11/2004 | Nuss |
| 2005/0097514 A1 | 5/2005 | Nuss |
| 2005/0108518 A1 | 5/2005 | Pandya |
| 2007/0282833 A1 * | 12/2007 | McMillen ....................... 707/6 |
| 2008/0071757 A1 * | 3/2008 | Ichiriu et al. ..................... 707/4 |
| 2008/0071765 A1 * | 3/2008 | Ichiriu et al. ..................... 707/5 |
| 2008/0071779 A1 | 3/2008 | Mammen et al. |
| 2008/0071780 A1 * | 3/2008 | Ichiriu et al. ..................... 707/6 |
| 2008/0133517 A1 | 6/2008 | Kapoor et al. |
| 2008/0140662 A1 | 6/2008 | Pandya |
| 2008/0212581 A1 | 9/2008 | Miller et al. |
| 2008/0270342 A1 | 10/2008 | Ruehle |
| 2009/0006392 A1 | 1/2009 | Chen et al. |
| 2009/0012958 A1 | 1/2009 | Raj |
| 2009/0172001 A1 | 7/2009 | McMillen |
| 2009/0227228 A1 | 9/2009 | Hu et al. |
| 2010/0138367 A1 | 6/2010 | Yamagaki |
| 2011/0082884 A1 | 4/2011 | Hollingsworth |
| 2011/0125695 A1 * | 5/2011 | Ruehle .............................. 706/46 |
| 2011/0137848 A1 * | 6/2011 | Stephens, Jr. .................... 706/52 |
| 2011/0153630 A1 | 6/2011 | Vernon et al. |
| 2011/0167063 A1 | 7/2011 | Tengli et al. |
| 2012/0005184 A1 * | 1/2012 | Thilagar et al. ............... 707/706 |

* cited by examiner

Token Programs

| Address | Instruction(s) |
|---|---|
| T1 | I1(1): Assert MRST to indicate R1 match<br>I1(2): Set flag F1 |
| T2 | I2(1): If flag F1 is set, then set flag F2 |
| T3 | I3(1): If flag F2 is set, then assert MRST to indicate R2 match |
| T4 | I4(1): If flag F1 is set, then assert MRST to indicate R3 match |

710

Regular Expressions

R1 = ab
R2 = ab .* cd .* ef
R3 = ab .* cristian

Tokens

T1 = ab
T2 = cd
T3 = ef
T4 = cristian

FIG. 7

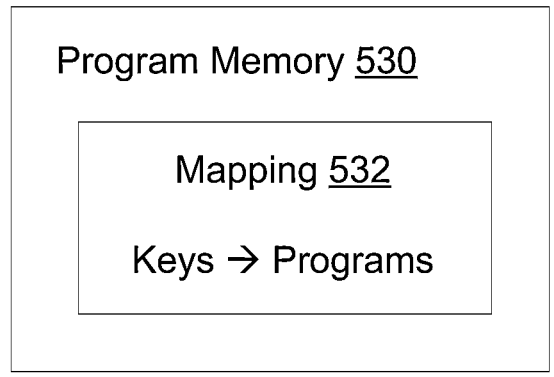

Program Memory 530

Mapping 532

Keys → Programs

FIG. 8A

| | Keys | Procedures |
|---|---|---|
| 536 { | T1 F1 | Procedure for T1 conditional on F1 |
| 538 { | T1 F6 | Procedure for T1 conditional on F6 |
| | T1 F56 | Procedure for T1 conditional on F56 |
| | T1 F128 | Procedure for T1 conditional on F128 |
| 534 → | T2 F43 | Procedure for T2 conditional on F43 |
| | T2 F56 | Procedure for T2 conditional on F56 |
| | T3 F23 | Procedure for T3 conditional on F23 |
| | T3 F67 | Procedure for T3 conditional on F67 |
| | T3 F95 | Procedure for T3 conditional on F95 |

FIG. 8B

Example 1

Flag F1            1101

Cancel Mask M1  1101   ✓   Matches

Cancel Mask M2  1001   🚫   Does not Match

Example 2

Cancel Mask M3  1**0

Flag F2            1110   ✓   Matches

Flag F3            1000   ✓   Matches

Flag F4            1001   🚫   Does not Match

FIG. 9

TOKEN STITCHER FOR A CONTENT SEARCH SYSTEM HAVING PIPELINED ENGINES

RELATED APPLICATION DATA

This application is a continuation-in-part and claims the benefit under 35 USC 120 of the co-pending and commonly owned U.S. patent application Ser. No. 12/838,323, entitled "Content Search System Having Pipelined Engines and a Token Stitcher," filed on Jul. 16, 2010, and which is incorporated by reference herein.

FIELD OF INVENTION

This invention generally relates to the field of content search systems, and specifically relates to evaluating partial match results produced by a search system.

BACKGROUND OF RELATED ART

Regular expression search operations are employed in various applications including, for example, intrusion detection systems (IDS), virus protections, policy-based routing functions, internet and text search operations, document comparisons, and so on. A regular expression can simply be a word, a phrase or a string of characters. For example, a regular expression including the string "gauss" would match data containing gauss, gaussian, degauss, etc. More complex regular expressions include metacharacters that provide certain rules for performing the match. Some common metacharacters are the wildcard ".", the alternation symbol "|", and the character class symbol "[ ]." Regular expressions can also include quantifiers such as "*" to match 0 or more times, "+" to match 1 or more times, "?" to match 0 or 1 times, {n} to match exactly n times, {n,} to match at least n times, and {n,m} to match at least n times but no more than m times. For example, the regular expression "a.{2}b" will match any input string that includes the character "a" followed exactly 2 instances of any character followed by the character "b" including, for example, the input strings "abbb," "adgb," "a7yb," "aaab," and so on.

Traditionally, regular expression searches have been performed using software programs executed by one or more processors, for example, associated with a network search engine. For example, one conventional search technique that can be used to search an input string of characters for multiple patterns is the Aho-Corasick (AC) algorithm. The AC algorithm locates all occurrences of a number of patterns in the input string by constructing a finite state machine that embodies the patterns. More specifically, the AC algorithm constructs the finite state machine in three pre-processing stages commonly referred to as the goto stage, the failure stage, and the next stage. In the goto stage, a deterministic finite state automaton (DFA) or search trie is constructed for a given set of patterns. The DFA constructed in the goto stage includes various states for an input string, and transitions between the states based on characters of the input string. Each transition between states in the DFA is based on a single character of the input string. The failure and next stages add additional transitions between the states of the DFA to ensure that a string of length n can be searched for in exactly n cycles. More specifically, the failure and next transitions allow the state machine to transition from one branch of the tree to another branch that is the next best (i.e., the longest prefix) match in the DFA. Once the pre-processing stages have been performed, the DFA can then be used to search any target for all of the patterns in the pattern set.

One problem with prior string search engines utilizing the AC algorithm is that that they are not well suited for performing wildcard or inexact pattern matching. As a result, some search engines complement the AC search technique with a non-deterministic finite automaton (NFA) engine that is better suited to search input strings for inexact patterns, particularly those that include quantifiers such as "*" to match 0 or more times, "+" to match 1 or more times, "?" to match 0 or 1 times, {n} to match exactly n times, {n, } to match at least n times, and {n,m} to match at least n times but no more than m times.

For example, commonly-owned U.S. Pat. No. 7,539,032 discloses a content search system that implements search operations for regular expressions that specify one or more exact patterns and one or more inexact patterns by delegating exact pattern search operations to a DFA engine that is dedicated to perform exact pattern search operations and by delegating inexact pattern search operations to an NFA engine that is dedicated to perform inexact pattern search operations, where the match results of the exact pattern search operations and the match results of the inexact pattern search operations are combined to generate a result code that indicates whether an input string matches one or more regular expressions specifying the exact and inexact patterns.

More specifically, FIG. 1 shows a content search system 100 of the type disclosed in commonly-owned U.S. Pat. No. 7,539,032. Search system 100 includes a system interface 110, a DFA engine 120, a data management unit 130, an NFA engine 140, and a result memory 150. The system interface 110 facilitates communication between search system 100 and an external network (e.g., the Internet), and is coupled to data management unit 130. More specifically, data management unit 130 receives input strings from the network via the system interface 110, selectively forwards portions of input strings to DFA engine 120 and/or NFA engine 140 for search operations, and coordinates communication between DFA engine 120, NFA engine 140, and result memory 150.

As disclosed in U.S. Pat. No. 7,539,032, the DFA engine 120 is configured to perform exact string match search operations to determine whether an input string contains exact patterns specified by one or more regular expressions, and the NFA engine 140 is configured to perform an inexact string match search operation to determine whether the input string contains one or more inexact patterns specified by one or more regular expressions. The DFA engine 120 is implemented according to the AC algorithm, and the NFA engine 140 is implemented using various circuits (e.g., microprocessors, microcontrollers, programmable logic such as FPGAs and PLDs) that can execute microprograms that embody the inexact patterns to be searched for. The result memory 150 includes a plurality of storage locations each for storing a result code that contains one or more match ID (MID) values, one or more trigger bits, and one or more microprogram indices. Each MID value identifies a corresponding exact pattern stored in the DFA engine that is matched by the input string, each trigger bit indicates whether the exact pattern identified by a corresponding MID value is part of a regular expression that requires inexact pattern search operations to be performed by the NFA engine, and each microprogram index can be used by the NFA engine to retrieve a microprogram that contains commands for implementing the inexact pattern search operation.

As mentioned above, content search system 100 implements regular expression search operations by delegating exact pattern matching functions to DFA engine 120 and delegating inexact pattern matching functions to NFA engine 140. For example, to determine whether an input string matches the regular expression R10="acid[a-n]{10,20}rain" using the search system 100 shown in FIG. 1, the exact patterns "acid" and "rain" are loaded into DFA engine 120, and a microprogram embodying the inexact pattern "[a-n]{10,20}" is loaded into the NFA engine 140. Further, the result memory is loaded with MID values for "acid" and "rain" and with a microprogram index identifying the microprogram that embodies the inexact pattern "[a-n]{10,20}." Then, during search operations, data management unit 130 forwards the input string to DFA engine 120, which in turn compares the input string to the prefix and suffix patterns "acid" and "rain." If a portion of the input string matches the prefix pattern "acid," the DFA engine 120 generates a first match index corresponding to the prefix pattern "acid," and in response thereto, the result memory 150 generates a result code that activates the NFA engine 140 and tells the NFA engine 140 the location of the microprogram embodying the inexact pattern "[a-n]{10,20}." Once activated, the NFA engine 140 begins searching the input string for the inexact pattern "[a-n]{10,20}," and also combines the exact match results from the DFA engine 120 for the suffix pattern "rain" to determine whether the input string contains the regular expression R10="acid[a-n]{10,20}rain."

Although the delegation of different portions (e.g., sub-expressions) of a regular expression to DFA and NFA search engines improves performance over conventional single-engine approaches, the limited resources of the NFA engine 140 can be quickly exhausted when searching for some types of regular expressions. For example, to implement search operations for the regular expression R11="ab.*cd" in search system 100, the prefix string "ab" is delegated to DFA engine 120 and the inexact pattern ".*cd" (which includes the unbounded sub-expression ".*") is delegated to the NFA engine 140. If the DFA engine detects a match with "ab", the NFA engine 140 is triggered, and it activates an NFA state that starts searching the input string for the suffix pattern "cd". However, because the "cd" can appear after zero or more instances of any character (thus making the ".*" an unbounded sub-expression), the corresponding NFA state remains active indefinitely (even after the suffix "cd" is found), which in turn indefinitely consumes a corresponding portion of the NFA engine's limited resources. When configured as such, for each rule or regular expression that includes the unbounded sub-expression ".*" a corresponding portion of the NFA engine's resources are indefinitely consumed, thereby not only undesirably degrading performance but also limiting the number of regular expressions or rules that the NFA engine can concurrently search for.

In addition, using the result memory to trigger the NFA engine and to provide a microprogram index in response to a match in the DFA engine is inefficient. Further, operating DFA and NFA engines of search system 100 in a parallel manner can allow partial match results from the engines to be generated out-of-order, in which case additional processing is performed (e.g., by the NFA engine) to re-order the partial match results so that match results between the input string and the regular expressions can be generated.

Thus, there is a need for a search system that can capitalize on the advantages of DFA and NFA search techniques with greater efficiency and without unnecessarily consuming the limited resources of either the DFA or NFA engine.

BRIEF DESCRIPTION OF THE DRAWINGS

The present embodiments are illustrated by way of example and not intended to be limited by the figures of the accompanying drawings, where:

FIG. 7 depicts illustrative search operations for several exemplary regular expressions using search systems configured in accordance with present embodiments;

FIG. 8A is an illustration of a mapping for identifying a program based on a key in accordance with some embodiments;

FIG. 8B is an illustration of an illustrative structure of keys of a mapping in accordance with some embodiments; and FIG. 9 is an illustration of several examples involving a cancel mask in accordance with some embodiments.

Like reference numerals refer to corresponding parts throughout the drawing figures.

DETAILED DESCRIPTION

Figure 1:
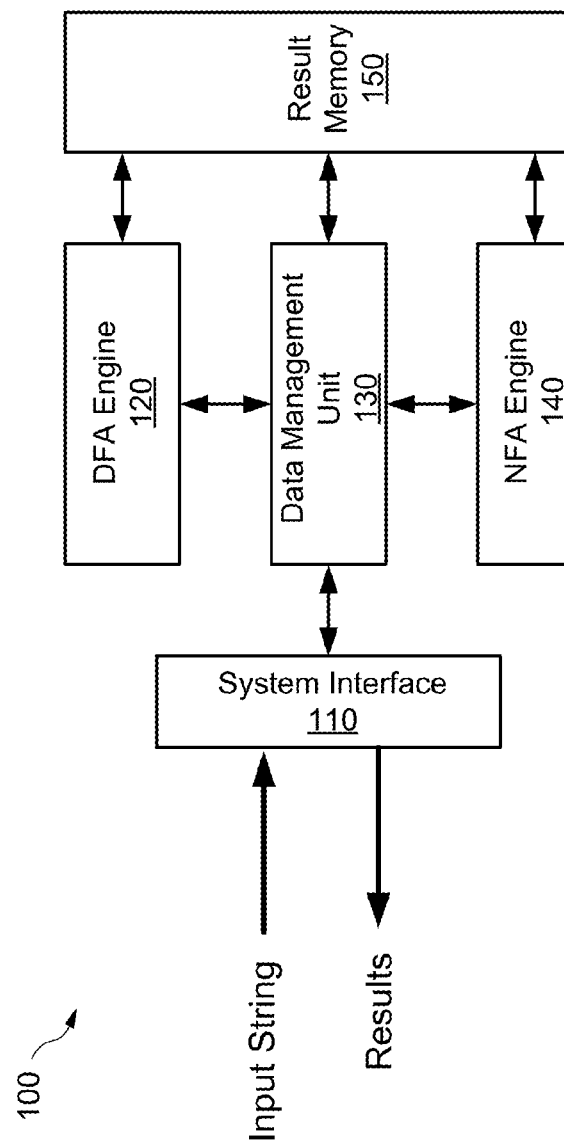
FIG. 1 shows a conventional search system employing a DFA engine and an NFA engine.

In the following description, numerous specific details are set forth such as examples of specific, components, circuits, and processes to provide a thorough understanding of present embodiments. It will be apparent, however, to one skilled in the art that these specific details need not be employed to practice the present embodiments. In other instances, well known components or methods have not been described in detail in order to avoid unnecessarily obscuring the present embodiments. As used herein, the terms "search tree" and "state graph" refer to state machines that embody one or more signatures to be searched for in an input string during string search operations, and are thus interchangeable. Further, the term "success transition," which refers herein to a goto transition from a current state to a next state in a search tree, is also commonly referred to as a "success edge." The term "coupled" as used herein means connected directly to or connected through one or more intervening components or circuits. Any of the signals provided over various buses described herein may be time multiplexed with other signals and provided over one or more common buses. Additionally, the interconnection between circuit elements or blocks may be shown as buses or as single signal lines. Each of the buses may alternatively be single signal lines, and each of the single signal lines may alternatively be buses. Additionally, the prefix symbol "/" or the suffix "B" attached to signal names indicates that the signal is an active low signal. Each of the active low signals may be changed to active high signals as generally known in the art.

The present embodiments include various method steps, which will be described below. The steps may be performed by hardware components or may be embodied in machine-executable instructions, which can be used to cause hardware components (e.g., a processor, programming circuit) programmed with the instructions to perform the steps. Alternatively, the steps can be performed by a combination of hardware and software. Further, the steps and operations discussed herein (e.g., the loading of registers) can be performed either synchronously or asynchronously.

A content search system is disclosed herein that can implement regular expression search operations more efficiently than prior approaches by pipelining multiple search engines that implement different portions of the regular expression. For some embodiments, the search pipeline includes a DFA engine, an NFA engine, and a token stitcher that combines partial match results generated by the DFA and NFA engines in a manner that prevents either engine from becoming a bottleneck. In addition, the token stitcher can be configured to implement unbounded sub-expressions (e.g., that include the ".*") without utilizing resources of the DFA or NFA engines, thereby advantageously allowing the DFA and NFA engines to operate more efficiently that prior approaches in which the DFA engine or NFA engine is tasked with implementing unbounded sub-expressions within regular expressions.

More specifically, in accordance with the present embodiments, different portions of the regular expression are delegated to different engines in the search pipeline, and tokens generated by the DFA engine and the NFA engine indicating partial matches with portions of the regular expression are combined and selectively processed by the token stitcher to generate a match result indicating whether an input string matches any of the regular expressions stored in the search system. As used herein, issuance of a token by an engine indicates that the engine has matched a portion of a regular expression with a portion of the input string. More specifically, present embodiments include a compiler that divides each regular expression into one or more sub-expressions, and each unique sub-expression is assigned to a corresponding token. When an engine in the search pipeline matches an input string with a sub-expression, the engine forwards the corresponding assigned token to the next engine in the pipeline. The last engine in the search pipeline uses tokens received from previous engines in the search pipeline to determine whether the input string matches the regular expression. For some embodiments, the last search engine is the token stitcher.

Figure 2:
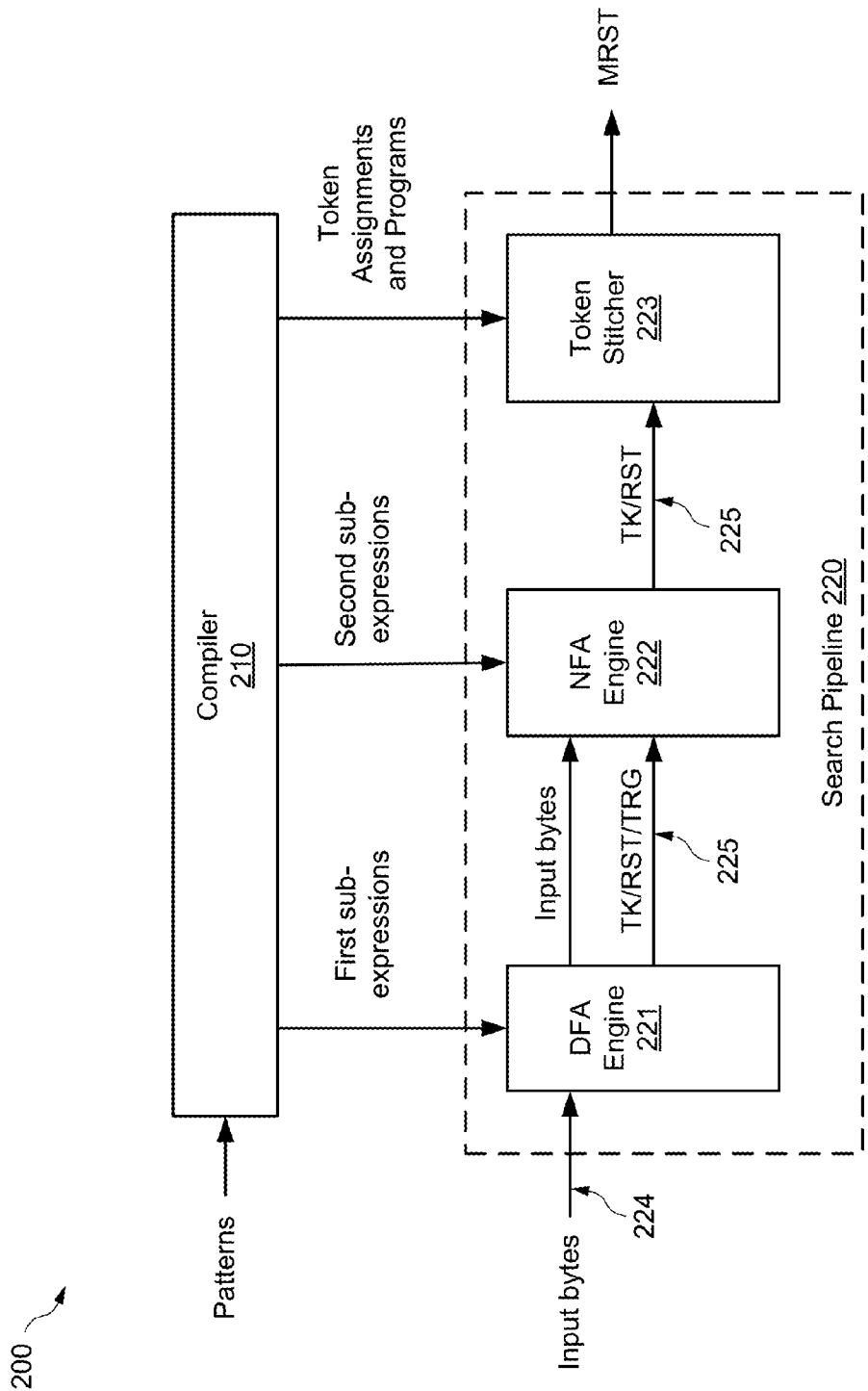
FIG. 2 shows a search system employing pipelined DFA and NFA engines in accordance with present embodiments.

FIG. 2 shows a content search system 200 in accordance with present embodiments. Search system 200 includes a compiler 210 and a search pipeline 220. The search pipeline includes a DFA engine 221, an NFA engine 222, a token stitcher 223, a data pipeline 224, and a result pipeline 225. Compiler 210 includes an input to receive a number of regular expressions to be stored in search system 200, and includes outputs coupled to DFA engine 221, to NFA engine 222, and to token stitcher 223. Compiler 210, which can utilize any suitable compiling techniques, compiles (e.g., divides) each received regular expression into a number of sub-expressions and/or quantifiers, and assigns a token to each unique sub-expression. For some embodiments, the compiler divides selected regular expressions into sub-expressions that are separated by quantified wildcard operator such as ".*" and ".{n}". For example, compiler 210 can divide or segment the regular expression R3=ab.*cd.*ef into three different sub-expressions S1-S3, where S1=ab, S2=cd, and S3=ef, and assign sub-expression S1 to a first token, assign sub-expression S2 to a second token, and assign sub-expression S3 to a third token. After compiling the regular expression, the compiler 210 delegates each resulting sub-expression (and quantifiers, if applicable) to one of DFA engine 221 and to NFA engine 222, and provides information to search pipeline 220 on how to process the regular expression. Thus, for example, compiler 210 can provide to DFA engine 221 information identifying the sub-expressions for which DFA engine 221 is responsible, can provide to NFA engine 222 information identifying the sub-expressions for which NFA engine 222 is responsible, and provide to token stitcher 223 stitching information about how to process tokens received from DFA engine 221 and NFA engine 222. More specifically, the stitching information instructs the token stitcher 223 how to stitch together the tokens (e.g., the how to combine partial matches) generated by the DFA and NFA engines to generate an overall output match signal (MRST) indicating whether the input string matches one or more of the regular expressions.

For many regular expressions, the compiler 210 delegates exact patterns (e.g., strings) to the DFA engine 221, delegates inexact patterns (e.g., sub-expressions including some quantified character classes) to the NFA engine 222, and delegates unbounded sub-expressions (e.g., ".*" and {5,}) to the token stitcher 223. For example, for some exemplary embodiments, simple strings such as "ab" are delegated as first sub-expressions to the DFA engine, and sub-expressions having bounded quantified characters classes such as "z{5}" and [d–f]{10} are delegated as second sub-expressions to the NFA engine. For some regular expressions, the compiler 210 can delegate some exact patterns (e.g., patterns that are longer than a specified length) to the NFA engine 222.

DFA engine 221, which for some embodiments is optimized for performing exact match searches, includes an input to receive input characters or bytes from an input string, a control input to receive sub-expressions delegated to the DFA engine by the compiler 210, and includes an output to provide tokens (TK), match results (RST), and/or a trigger signal (TRG) onto the result pipeline 225. As explained in more detail below, the tokens (TK) generated by DFA engine 221 indicate partial matches between the input string and sub-expressions stored in the DFA engine 221, the match results (RST) generated by DFA engine 221 indicate complete matches between the input string and rules or regular expressions stored entirely in the DFA engine 221, and the trigger signal TRG activates the NFA engine 222 to begin processing the input bytes in the data pipeline 224.

NFA engine 222, which is capable of performing inexact match searches, includes a first input to receive the input bytes from the data pipeline 224, includes a second input to receive tokens (TK), match results (RST), and/or the trigger signal (TRG) from DFA engine 221 via the result pipeline 225, includes a control input to receive sub-expressions delegated to the NFA engine by the compiler 210, and includes an output to provide tokens (TK) and match results (RST) onto the result pipeline 225. The tokens (TK) generated by NFA engine 222 indicate partial matches between the input string and sub-expressions stored in the NFA engine 222, and the match results (RST) generated by NFA engine 222 indicate complete matches between the input string and rules or regular expressions stored entirely within the NFA engine or entirely within the DFA and NFA engines.

The token stitcher 223 includes a first input to receive tokens (TK) and match results (RST) from engines 221 and/or 222 via the result pipeline 225, includes a control input to receive token assignments and associated programs from the compiler 210, and includes an output to generate a match result signal MRST that indicates whether the input string matches one or more of the regular expressions stored in the content search system 200. As described in more detail below, the token stitcher 223 is configured to combine and selectively process the tokens (TK) to generate the match result (MRST). Further, in accordance with present embodiments, the token stitcher 223 can be used to implement unbounded sub-expressions such as ".*" without maintaining active state of a state machine or using the resources of the DFA and NFA engines. Note that match results (RST) generated by DFA engine 221 and/or NFA engine 222 are passed through the token stitcher 223 and provided as output match results (MRST).

Figure 3A:
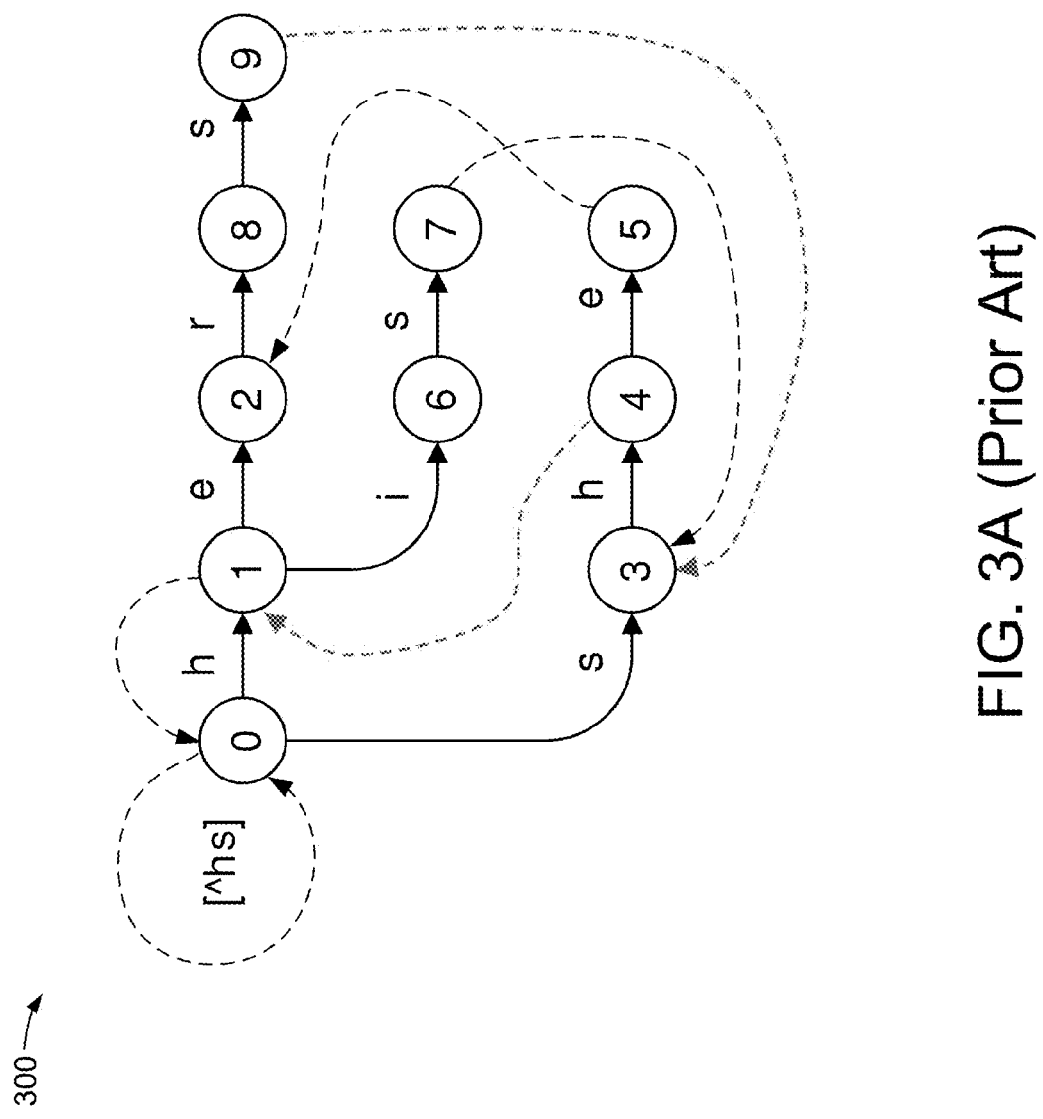
FIG. 3A shows a state machine configured to search an input string for the patterns {he, she, his, hers} according to the Aho-Corasick algorithm.

As mentioned above, for some embodiments, DFA engine 221 is optimized for exact match operations. More specifically, for exemplary embodiments described herein, DFA engine 221 performs search operations according to the Aho-Corasick algorithm. For example, FIG. 3A illustrates a goto-failure state graph 300 that embodies a search operation for the strings {he, she, his, hers} according to the well-known Aho-Corasick (AC) state machine. Search operations between an input string and the strings or signatures {he, she, his, hers} begin at the root state (state 0), at which the first input character is compared with the two goto transitions "h" and "s" originating at state 0. If there is a match, then the matching goto transition is taken to the next state. Each of the goto transitions is depicted as a solid line extending from the previous state to the next state, and is accompanied by the character value or "edge" that enables the goto transition to the next state. For example, if the first input character is an "h," then the "h" goto transition is taken to state 1, and then the next input character is compared with the corresponding goto transitions "e" and "i" originating at state 1.

If there is not a match between the current input character and any of the success edges associated with the current state, then a failure transition is taken to a fail state. The failure transitions are depicted as dotted lines in FIG. 3A. Although not shown for simplicity, each of states 2, 3, 6, and 8 includes a failure transition to the root state. For example, if the current input character examined at state 1 is not an "e" or an "i," then the failure transition is taken from state 1 to the root state. Some of the failure transitions terminate at states other than the root state because a portion of another string has already been matched. For example, if the current input character examined at state 4 is not an "e," the failure transition is taken to state 1 because the "h" edge to state 1 has already been matched. In addition, states 2, 5, 7, and 9 are designated as output states because if any of those states is reached, at least one of the signatures has been matched by the input string, and an output code indicating the matching signature can be provided.

Figure 3B:
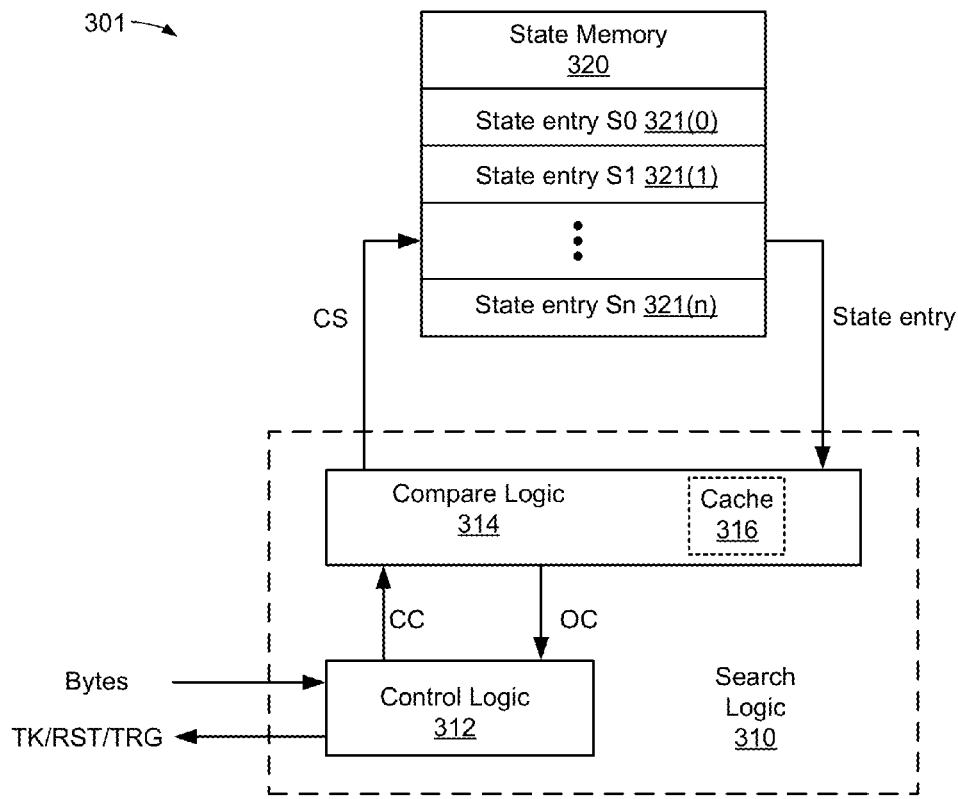
FIG. 3B shows a DFA search engine configured to perform string searches using deterministic state machines of the type shown in FIG. 3A.

FIG. 3B shows a search engine 301 that can perform search operations according to state machines of the type described above with respect to FIG. 3A. Search engine 301, which is one embodiment of DFA engine 221 of FIG. 2, includes search logic 310 coupled to a state memory 320. State memory 320, which can be any suitable type of randomly addressable memory (RAM) device (e.g., an SRAM, DRAM, EEPROM, or Flash Memory device), includes a plurality of storage locations 321(0)-321(n) for storing state information of a search tree. For simplicity, each storage location 321 of state memory 320 is depicted in FIG. 3B as storing the state entry for a corresponding one of states S0-Sn of a search tree to be searched, although it is noted that some state entries may require more than one row in state memory 320.

Figure 3C:
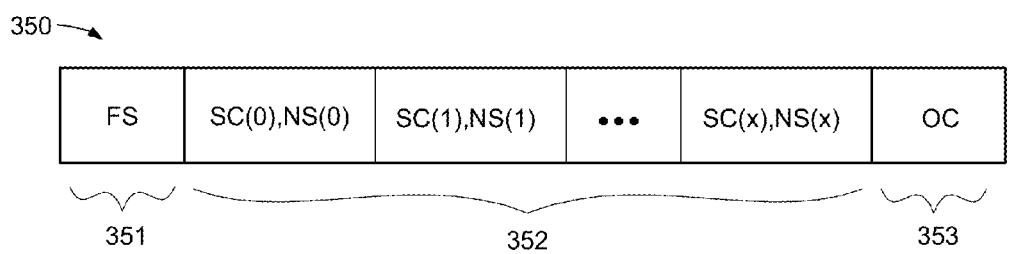
FIG. 3C shows an exemplary data format for the state entries of a typical state machine stored in the search engine of FIG. 3A.

FIG. 3C shows an exemplary state entry 350 that is illustrative of the format of the state entries stored in state memory 320 of FIG. 3B. State entry 350 includes a fail state (FS) field 351, a success transition field 352, and an output code (OC) field 353, and may be collectively represented as {FS; ST[0:x]; OC}. More specifically, the FS field 351 stores a single state value that indicates the fail state of the state represented by state entry 350, the ST field 352 stores one or more pairs of success characters (SC) and corresponding next state (NS) values, and the OC field 353 stores one or more output codes. For example, the state entry for state 1 of the goto-failure graph 100 of FIG. 1 can be represented as S1={0; e,2; i,6; 0}, where FS=0 indicates that the root state 0 is the fail state of state 1, ST[0]="e,2" indicates that state 1 includes an "e" success transition to a next state 2, ST[1]="i,6" indicates that state 1 includes an "i" success transition to a next state 6, and OC=0 indicates that state 1 does not include an output code. The output codes for the match states of the state machine stored in state memory 320 also include tokens, match results, and/or trigger signals.

Search logic 310 includes control logic 312 and compare logic 314. Control logic 312, which includes an input port to receive an input string from a network connection (not shown for simplicity) and an output port to provide search results to the network connection, controls search operations between the input string and the signatures embodied by the search tree stored as state entries in state memory 320. Compare logic 314, which is coupled to state memory 320 and to control logic 312, implements the string search operation using a DFA embodied by the search tree stored in state memory 320. Further, although not shown in FIG. 3C for simplicity, search logic 310 typically includes registers, logic, and/or other suitable circuitry for storing and incrementing an input cursor (C) that points to the current input character of the input string being searched.

For example, during search operations, compare logic 314 provides a current state (CS) value as an address to state memory 320, which in response thereto outputs a corresponding state entry to compare logic 314. Compare logic 314 then compares the current character (CC) extracted from the input string by control logic 312 (e.g., in response to the cursor values) to the success characters (SC) of the success transition fields in the retrieved state entry to determine the next state in the search tree. If the current character matches one of the state's success transitions, the corresponding next state (NS) value is read from the state entry, and the next state value is used as the new current state (CS) value to address and retrieve the corresponding next state entry from state memory 320. A cache memory 316 is typically provided to store the state entry for the root state so that the corresponding state entry is locally stored within compare logic 314 and can thus be quickly retrieved without accessing state memory 320. In this manner, edge failures to the root state do not require access to state memory 320, thereby eliminating RAM read latencies when the state machine fails to the root state. Other state entries (e.g., such as state entries that are frequently accessed by the search engine) can also be stored in cache memory 316.

Figure 4:
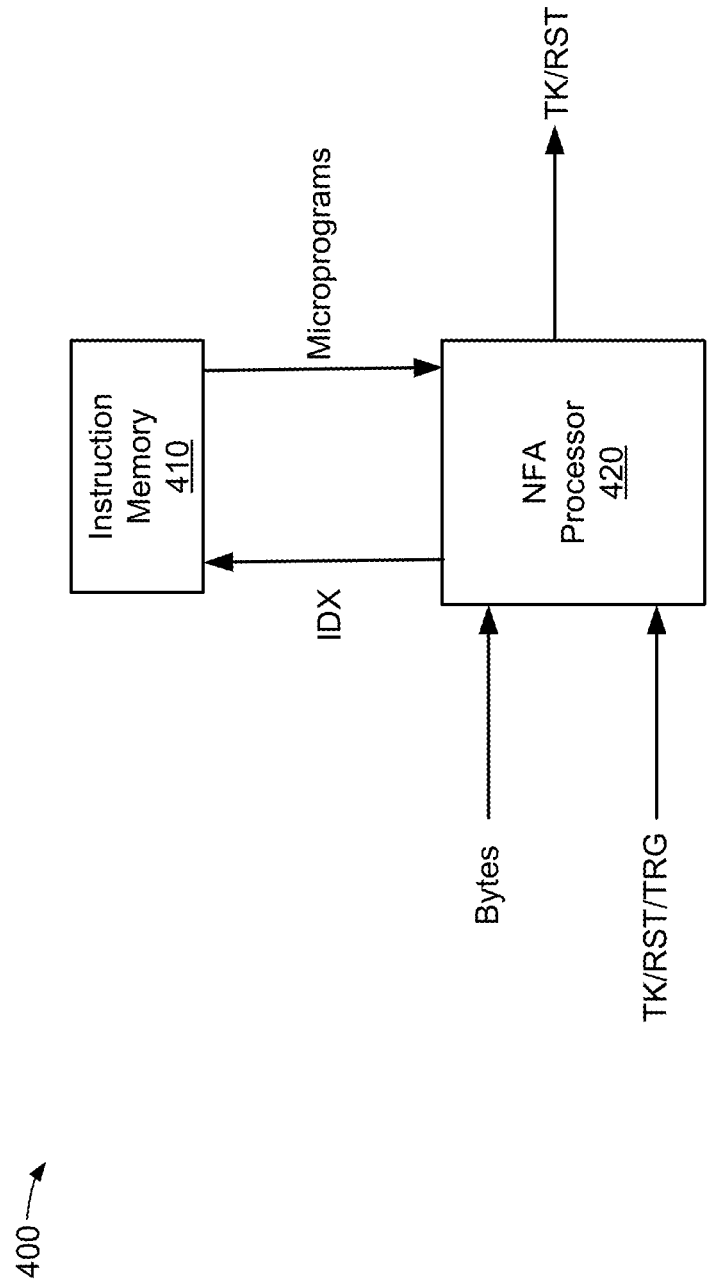
FIG. 4 shows an NFA engine that is one embodiment of the NFA search engine of FIG. 2.

NFA engine 222 can be any suitable search engine capable of performing inexact match operations. For some exemplary embodiments described herein, NFA engine 222 performs search operations (at least in part) by executing microprograms (e.g., instructions) that embody the inexact and/or exact patterns delegated thereto. For example, FIG. 4 shows an NFA engine 400 that is one embodiment of NFA engine 222 of FIG. 2. NFA engine 400 includes an instruction memory 410 and an NFA processor 420. Instruction memory 410, which can be any suitable type of memory device such as SRAM or DRAM, includes a plurality of storage locations for storing a plurality of microprograms. Each microprogram, which can be retrieved using a corresponding microprogram index, embodies one of the inexact patterns specified by one or more of the regular expressions searched for by content search system 200. NFA processor 420 is configured to execute any of the microprograms stored in instruction memory 410 to determine whether an input string matches one of the inexact patterns embodied in the microprograms. For other embodiments, NFA processor 420 can be used to search an input string for both exact patterns and inexact patterns (e.g., by embodying the exact patterns and inexact patterns into microprograms stored in the instruction memory 410). For one embodiment, NFA engine 222 can be similar to the NFA engines disclosed in commonly-owned U.S. Pat. No. 7,539,032.

Referring again to FIG. 2, during search operations between an input string and regular expressions stored in the search system 200, input bytes (e.g., characters of the input string) are provided to the content search system 200 via the data pipeline 224. The DFA engine 221 receives the input bytes or characters, and compares each input character with the sub-expressions for which DFA engine 221 is responsible (e.g., as embodied by signatures in the state machine stored in DFA engine 221). For each character comparison, if DFA engine 221 finds a match between the input string and a sub-expression for which DFA engine 221 is responsible, then DFA engine 221 outputs either the token TK associated with the matched sub-expression or the match result signal RST associated with the matched rule onto the result pipeline 225. For example, if the pattern matched by the DFA engine is part of a regular expression having other sub-expressions delegated to NFA engine 222, then DFA engine 221 outputs the token indicating a partial match with the regular expression. If the pattern matched by the DFA engine is an entire rule, then DFA engine 221 outputs the match result RST indicating a match between the input string and the rule.

Conversely, if DFA engine 221 does not find a match between the input string and a sub-expression for which DFA engine 221 is responsible, then DFA engine 221 does not generate an output.

The DFA engine 221 can also send a trigger (TRG) signal to NFA engine 222 to instruct NFA engine 222 to search for a particular sub-expression for which NFA engine 222 is responsible. Thus, for some embodiments, NFA engine 222 does not perform any compare operations on the input string unless instructed by DFA engine 221, thereby conserving the limited resources of the NFA engine. As a result, NFA engine 222 can operate more efficiently than prior approaches in which the NFA engine processes all the characters of the input string. Further, allowing the DFA engine 221 to directly trigger the NFA engine 222 (e.g., in response to an asserted trigger signal) in a pipelined manner maximizes performance. This is in contrast to the search system disclosed in commonly-owned U.S. Pat. No. 7,539,032, which uses the result memory to trigger the NFA engine.

DFA engine 221 can be instructed as to how to trigger NFA engine 222 by the information provided by compiler 210. In other words, when compiler 210 compiles a regular expression, compiler 210 provides information to DFA engine 221 indicating the conditions under which to trigger the NFA engine 222 to start performing compare operations on the input string. For example, the DFA engine 221 can be instructed by compiler 210 to trigger NFA engine 222 if DFA engine 221 finds a match between a portion of the input string and a selected sub-expression stored in its state memory 320.

Note that regardless of whether DFA engine 221 generates a token or a match result (e.g., in response to finding a match between the input string and the sub-expressions for which it is responsible), the input characters are provided via the data pipeline 224 to NFA engine 222 for search operations therein. Thus, NFA engine 222 receives the same input string as DFA engine 221 and, when activated, processes the same input characters in the same order as DFA engine 221 (i.e., DFA engine 221 does not provide an altered input stream to NFA engine 222). In this manner, the input bytes are processed by the DFA and NFA engines in a pipelined fashion.

As mentioned above, NFA engine 222 begins comparing characters in the input stream received from DFA engine 221 with those sub-expressions for which NFA engine 222 is responsible when triggered by DFA engine 221. If the NFA engine 222 finds a match between the input stream and an associated sub-expression, then NFA engine 222 outputs either the token TK associated with the matched sub-expression or the match result signal RST associated with the matched rule onto the result pipeline 225. For example, if the pattern matched by the NFA engine is part of a regular expression having other sub-expressions delegated to DFA engine 221, then NFA engine 222 outputs the token indicating a partial match with the regular expression onto the result pipeline 225. If the pattern matched by the NFA engine is an entire rule, then NFA engine 222 outputs the match result RST indicating a match between the input string and the rule onto the result pipeline 225.

In response to the tokens issued by the DFA engine 221 and the NFA engine 222, the token stitcher 223 determines whether the input string matches any of regular expressions stored in the search system. More specifically, the token stitcher 223 stitches together the tokens provided by the DFA and/or NFA engines 221 and 222 to determine whether the input string matches one or more of the regular expressions stored in the content search system 200. Because the DFA engine 221 and the NFA engine 222 output tokens on the result pipeline 225 as they sequentially process bytes of the input string, the tokens may be received by token stitcher 223 in the same order as the input characters that resulted in their generation, regardless of which engine generated the tokens. For example, in some embodiments, if DFA engine 221 issues token T1 after processing character 2 of the input stream and issues token T3 after processing character 5 of the input stream, and if NFA engine 222 issues token T2 after processing character 3 of the input stream, then token stitcher 223 will receive token T1 first, then token T2, and finally token T3. In this manner, the token stitcher 223 does not need to re-order the tokens provided onto the result pipeline 225 by the DFA and NFA engines.

For some embodiments, result data output by the DFA and NFA engines onto the result pipeline 225 includes identifiers (e.g., a number of leading or most significant bits) that indicate whether the result data is a token TK, a match result RST, or a trigger signal TRG. For an exemplary embodiment, the DFA and NFA engines are configured to output an N-bit result data that includes a 2-bit identifier and a data field of N−2 bits where, for example, an identifier "00" indicates that the result data is a token, an identifier "01" indicates that the result data is a match result, and an identifier "10" indicates that the result data is a trigger signal (of course, for other embodiments, other identifiers code can be assigned to the tokens, engine results, and trigger signal). In this manner, the NFA engine 222 can be configured to latch only trigger signals provided onto the result pipeline 225 (e.g., by looking for data groups that begin with the trigger identifier "10"), thereby ignoring tokens and match results provided by DFA engine 221 onto the result pipeline 225. Similarly, the token stitcher 223 can be configured to latch only tokens provided onto the result pipeline 225 (e.g., by looking for data groups that begin with the token identifier "00"), thereby ignoring match results RST that can be output as overall match results MRST.

Figure 5:
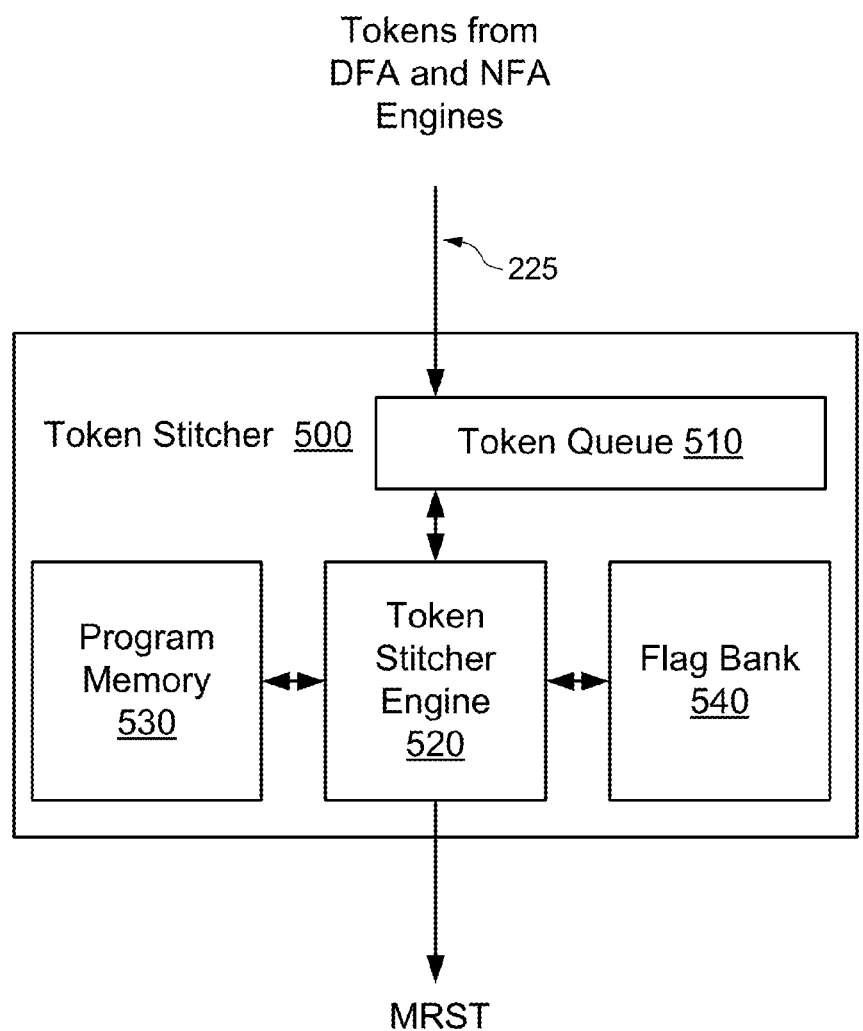
FIG. 5 is a functional block diagram of a token stitcher in accordance with some embodiments.

FIG. 5 is a block diagram of a token stitcher 500 that is one embodiment of token stitcher 223 of FIG. 2. As shown in the exemplary embodiment of FIG. 5, token stitcher 500 includes a token queue 510, a token stitcher engine 520, a program memory 530, and a flag bank 540. The token queue 510 includes an input to receive tokens from the result pipeline 225, and includes an output coupled to the token stitcher engine 520. The token stitcher engine 520 is coupled to both program memory 530 and flag bank 540, and includes an output to send the overall match result (MRST).

More specifically, tokens received by token stitcher 500 are initially stored in token queue 510 until they can be processed by token stitcher engine 520. Token queue 510 can be any suitable memory device or element that can queue tokens. For some embodiments, token queue 510 is a first-in-first-out (FIFO) queue.

Token stitcher engine 520, which can be implemented in software, microcode, or any other set of executable instructions, or hardware, uses tokens received from the result pipeline 225 to retrieve corresponding programs from program memory 530. Then, the token stitcher engine 520 executes the retrieved program to set one or more flags stored in the flag bank 540, to check the status of one or more flags stored in the flag bank, and to stitch together the partial results associated with the tokens to generate the overall match result signal MRST.

Program memory 530, which can be any suitable memory device or element, stores one or more programs that can be addressed by the tokens received from the result pipeline 225. The programs stored in program bank 530, which are constructed by compiler 210, embody portions of various regular expressions stored in the content search system 200, and instruct the token stitcher engine 520 how to combine (e.g., stitch together) the tokens generated by the DFA and NFA engines to generate the output match result MRST. For example, when a set of regular expressions is compiled, compiler 210 creates and stores one or more associated programs in the program memory 530. Thereafter, compiler 210 can inform DFA engine 221 and NFA engine 222 of the sub-expressions for which they are responsible, as well as the tokens associated with those sub-expressions.

Flag bank 540, which can be any suitable memory device or element, stores a plurality of flags that indicate whether partial matches are detected by DFA engine 221 and/or NFA engine 222. More specifically, each flag stored in the flag bank 540 indicates that a sequence of tokens and the appropriate separators (e.g., number of input characters) between them have been seen, and therefore whether sub-expressions delegated to DFA engine 221 and NFA engine 222 have been found in the input string. Thus, for some embodiments, the flags stored in the flag bank 540 are used to "remember" what sub-expressions have been seen for a particular input string. In this manner, the flag bank 540 can be used remember the partial match results generated by the DFA and NFA engines, thereby advantageously increasing the speed of the NFA engine and/or allowing the states of the NFA engine to be used for implementing other regular expressions (e.g., thereby increasing processing capacity). Further, because flag bank 540 is essentially a memory device, it can be easily expended to include additional memory locations to store greater numbers of flags. In contrast, it is much more difficult to expand the number of states implemented in the NFA engine 222. Thus, by using the flag bank 540 to remember partial match results generated by the DFA and NFA engines, rather than using the limited resources of the NFA engine 222, data throughput is increased as compared to conventional search systems of the type disclosed in U.S. Pat. No. 7,539,032. For one embodiment, NFA engine 222 includes 64 states, and flag bank 540 includes 128 memory locations to store 128 flags.

For some embodiments, flag bank 540 uses a different set of flags for each input string or flow processed by the search system 200. Thus, a single flag within flag bank 540 is only used for a single input string at a time. In some embodiments, flag bank 540 can accommodate the processing of multiple input strings by supporting more flags than are allocated to a single input string at a time. In other embodiments, token stitcher 500 may perform a context switch operation by saving the state of the current values of all the flags in flag bank 540. The current values of all the flags in flag bank 540 are associated with one input stream. Token stitcher 500 may then reset the values of all the flags in flag bank 540 to a prior state associated a different input stream. In this way, if need be, token stitcher 500 may stop processing one input stream, and return to a prior state when token stitcher was processing a different input stream.

As mentioned above, when a program associated with a token is executed, the program can access flag bank 540 to either check the status of and/or set one or more flags stored therein. This enables token stitcher engine 520 to remember what partial matches (e.g., sub-expressions delegated to the engines 221 and 222) have been detected and to determine whether there is a match between the input string and one or more regular expressions, for example, as described in more detail below with respect to FIG. 6.

Figure 6:
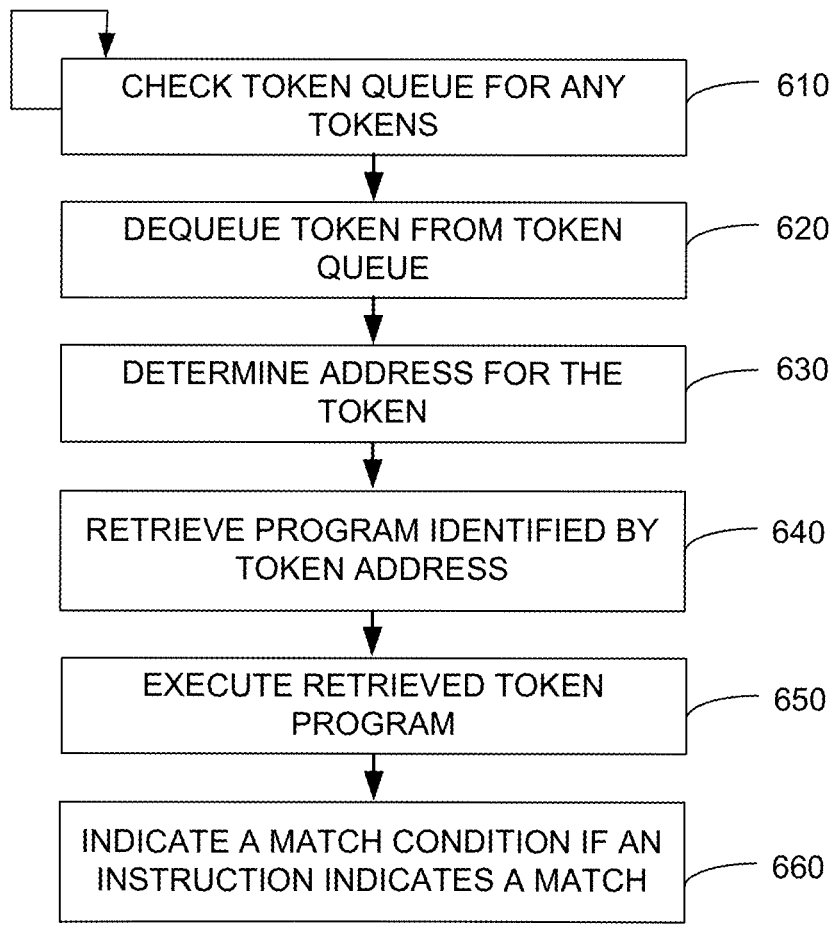
FIG. 6 is a flowchart illustrating an exemplary operation of one embodiment of the token stitcher of FIG. 5.

FIG. 6 is an illustrative flow chart depicting an exemplary operation of the token stitcher 500. Referring also to FIG. 5, token stitcher engine 520 checks token queue 510 to determine whether token queue 510 contains any tokens (610). As shown in FIG. 6, token stitcher engine 520 may repeatedly perform step 610 until token stitcher engine 520 successfully finds a token in token queue 510, although token stitcher engine 520 may wait a specified period of time before rechecking to allow enough time for a token to be queued in token queue 510. Once a token is present within token queue 510, token stitcher engine 520 dequeues a token from token queue 510 and processes the token (620).

Token stitcher engine 520 begins processing the token by determining an address of a program associated with or identified by the token (630). For some embodiments, each token is an address that identifies an associated program stored in the program memory 530. Alternatively, token stitcher engine 520 can include another mechanism for mapping the token to an address of a program within program memory 530.

Next, token stitcher engine 520 retrieves from program memory 530 the program addressed by the token (640). Then, token stitcher engine 520 executes the retrieved program (650). In response to execution of the program, the token stitcher engine 520 can access flag bank 540 and/or can determine if there is a match between the input string and one or more regular expressions. Thus, if the token stitcher engine 520 determines that the all the tokens associated with a particular regular expression have been generated in the correct order by the DFA and/or NFA engines, then the token stitcher engine 520 indicates a match condition between the input string and the regular expression (660).

FIG. 7 depicts three illustrative regular expressions R1-R3 and the tokens assigned to each of the unique sub-expressions within the three regular expressions, where R1="ab", R2="ab.*cd.*ef", and R3="ab.*cristion". Thus, R1 includes a single sub-expression "ab", R2 includes three sub-expressions "ab", "cd", and "ef", and R3 includes two sub-expressions "ab" and "cristian". As depicted in FIG. 7, the sub-expression "ab" is assigned to token T1, the sub-expression "cd" is assigned to token T2, the sub-expression "ef" is assigned to token T3, and the sub-expression "cristian" is assigned to token T4. Even though each of regular expressions R1, R2, and R3 include the sub-expression "ab", the unique sub-expression "ab" is assigned to a single corresponding token T1.

Table 710 of FIG. 7 depicts illustrative token programs associated with each the four tokens T1-T4 assigned to the various unique sub-expressions included within the group of regular expressions R1-R3. Referring also to FIG. 5, each program includes one or more instructions that can be executed by the token stitcher engine 520 in response to receiving tokens generated by the pipelined engines via the result pipeline. For the example of FIG. 7, the sub-expressions are all stored in the DFA engine 221. Thus, during search operations between an input string and the regular expressions R1-R3, if DFA engine 221 detects a match with the sub-expression "ab", the engine issues token T1 onto the result pipeline 225, and the token T1 is queued in the token queue 510. In response thereto, the token stitcher engine 520 uses token T1 to retrieve the corresponding program from the program memory 520, and executes the instructions I1(1) and I(2) associated with the T1 program. More specifically, execution of instruction I1(1) causes the token stitcher engine 520 to assert MRST to indicate a match with regular expression R1, and execution of instruction I1(2) causes the token stitcher engine 520 to set a first flag F1 in the flag bank 540 indicating that the sub-expression "ab" has been found. In this manner, flag bank 540 remembers that a partial match with "ab" associated with token T1 has been found.

Then, if DFA engine 221 detects a match with the sub-expression "cd", the engine issues token T2 onto the result pipeline 225, and the token T2 is queued in the token queue 510. In response thereto, the token stitcher engine 520 uses token T2 to retrieve the corresponding program from the program memory 530, and executes the instruction I2(1) associated with the T2 program. More specifically, execution of instruction I2(1) causes the token stitcher engine 520 to check the status of the flag F1 stored in the flag bank 540, and if the flag F1 is set (which indicates a partial match has been found with sub-expression "ab"), then the token stitcher engine 520 sets the flag F2 indicating that the sub-expression "cd" has been found. In this manner, flag bank 540 remembers that a partial match with "cd" associated with token T2 has been found.

Checking the status of the flag F1 associated with "ab" before setting the flag F2 associated with "cd" ensures that the sub-expression "ab" appears in the input string before the sub-expression "cd" (e.g., by checking to ensure that token T1 is received by the token stitcher before token T2). For other embodiments (not shown in FIG. 7), the T2 program can be configured to set the flag F2 regardless of whether the flag F1 is set, in which case the T2 program is responsible for determining whether the tokens T1 and T2 are received in the order specified by the corresponding regular expression(s).

Next, if DFA engine 221 detects a match with the sub-expression "ef", the engine issues token T3 onto the result pipeline 225, and the token T3 is queued in the token queue 510. In response thereto, the token stitcher engine 520 uses token T3 to retrieve the corresponding program from the program memory 520, and executes the instruction I3(1) associated with the T3 program. More specifically, execution of instruction I3(1) causes the token stitcher engine 520 to check the status of the flag F2 stored in the flag bank 540, and if the flag F2 is set (which indicates a partial match has been found with sub-expressions "ab" and "cd"), then the token stitcher engine 520 asserts MRST to indicate that the input string matches the regular expression R2. In this manner, flag bank 540 remembers that partial matches with "ab" and "cd" have been found, and allows the token stitcher engine 520 to assert MRST if the sub-expression "ef" is subsequently found.

Otherwise, if DFA engine 221 detects a match with the sub-expression "cristian", the engine issues token T4 onto the result pipeline 225, and the token T4 is queued in the token queue 510. In response thereto, the token stitcher engine 520 uses token T4 to retrieve the corresponding program from the program memory 530, and executes the instruction I4(1) associated with the T4 program. More specifically, execution of instruction I4(1) causes the token stitcher engine 520 to check the status of the flag F1 stored in the flag bank 540, and if the flag F1 is set (which indicates a partial match has been found with sub-expression "ab"), then the token stitcher engine 520 asserts MRST to indicate that the input string matches the regular expression R3. In this manner, flag bank 540 remembers that a partial match with "ab" have been found, and allows the token stitcher engine 520 to assert MRST if the sub-expression "cristian" is subsequently found.

The ability for the token stitcher to remember that sub-expressions (e.g., partial matches) have been found allows the token stitcher to implement the unbounded sub-expression ".*" by setting flags in the flag bank 540, thereby avoiding the need to invoke the NFA engine 222 to implement the ".*" function. For example, after the flag F1 is set in response to DFA engine detecting a match with "ab", the NFA engine 222 is not triggered (thereby not activating states in the NFA engine for regular expressions R1-R3), and the DFA engine 221 continues to compare characters of the input string with the sub-expressions to determine whether the sub-expressions "cd" and "ef" are subsequently detected or if the sub-expression "cristian" is subsequently detected. Thus, for example, regardless of how many characters appear in the input string between the sub-expressions "ab" and "cristian", the token stitcher 500 remembers the partial match with "ab" upon detecting the partial match with "cristian" and can therefore declare a match condition with regular expression R3 simply by checking the status of the flag F1. This is in contrast to prior search systems (such as that disclosed in U.S. Pat. No. 7,539,032) that typically delegate the sub-expression ".cristian" to the NFA engine.

Although described above as being able to implement the unbounded sub-expression ".*", the token stitchers of the present embodiments can also be used to implement other unbounded sub-expressions such as included in the following regular expression: R21="ab.{5,}cd", R22="ef.{0,5}gh", R23="ij[^\n]*kl", and R24="^.{5,15}mn". Note that the ^ in R24 indicates start-anchoring (the expression means find the string "mn" at distance somewhere between 5 and 15 characters from the start of the input stream, and that the ^ in R23 indicates that the "filler" between the two strings of interest "ij" and "kl" should consist of non-newline characters. Thus, more generally speaking, the token stitcher can implement other unbounded sub-expressions, such as quantifiers of the form {n, }, {n,m}, and {0 μm}, by storing an offset to the input string for each token identifying which character of the input string resulted in generation of the token, and using such offset information to ensure that any quantifiers are satisfied.

In some embodiments, when an input string is determined to match a sub-expression, token stitcher engine 520 stores offset information that includes a begin offset and an end offset for the sub-expression. The begin offset identifies the location in the input string of the beginning of the matched sub-expression, while the end offset identifies the location in the input string of the end of the matched sub-expression. In this way, given a regular expression R="abc.*cde", programs in program memory 530 can determine that a string S1="abcde" does not match the regular expression R because the end offset of sub-expression "abc" overlaps with the begin offset of sub-expression "cde" in S1. Similar computations may be performed to support other unbounded sub-expressions, such as quantifiers of the form {n, }, {n,m}, and {0,m}.

In some embodiments, offset information is stored for the first occurrence of a sub-expression in an input string. Other embodiments may additionally or alternately store offset information for the last occurrence of a sub-expression in an input string. Certain embodiments may store offset information for all of the occurrences of a sub-expression in an input string. By storing such offset information, comparisons involving additional types of unbounded sub-expressions may be supported.

Certain sub-expressions appear frequently in regular expressions. Such popular sub-expressions may represent common commands or statements, e.g., one category of popular sub-expressions may be SQL commands relied upon to perform malicious activity. Since popular sub-expressions are referenced by a large number of regular expressions, a program in program memory 530 that is associated with a token representing a popular sub-expression may be quite long in length as a result of the large number of instructions contained therein. An exemplary program for processing a token for a popular sub-expression may contain 5,000 or more different entries that each identifies how to process one of the 5,000 or more regular expressions that include the popular sub-expression. Programs having a large number of entries become slow to process and require more computational resources than is desirable.

To address this concern, in certain embodiments, when compiling a regular expression, if the regular expression compiler determines that a sub-expression is included in more than a predetermined number of different regular expressions (for example, 10 regular expressions), then the compiler may instruct token stitcher engine 520 to process the token associated with the popular sub-expression using mapping 532 (depicted in FIG. 8A). Mapping 532 is maintained in program memory 530 and broadly represents any data structure or mechanism for associating tokens to procedures for processing tokens. Mapping 532 may include a plurality of keys that are each based on data that identifies two pieces of information, namely data identifying (a) a token and (b) a particular activated flag in flag bank 540. Rather than employing a single program comprising a large number of entries (which, in the above example, was at least 5,000 entries), programs associated with popular tokens in certain embodiments may consult mapping 532 once for each flag in flag bank 540 which is activated (which typically would be 128 flags or less).

FIG. 8B shows an exemplary hash table 534 that is one embodiment of mapping 532 of FIG. 8A. Each key of hash table 534 identifies or corresponds to a token and an activated flag in flag bank 540. For example, key 536 identifies or corresponds to token T1 and activated flag F1, while key 538 identifies or corresponds to token T1 and activated flag F6. Each key in hash table 534 identifies a procedure for processing the token associated with the key. For example, key 536 identifies a procedure for processing token T1. Note that, as shall be explained below, the procedure identified by key 536 is only performed if the flag associated with key 536, namely flag F1, is activated in flag bank 540.

Note that multiple keys in hash table 534 may identify a procedure for processing the same token, e.g., key 536 and key 538 each identify a procedure for processing token T1; however, the particular procedure identified by key 536 and 538 may be different. If token stitcher engine 520 is processing T1 and F1 is asserted, then the procedure identified by key 536 will be performed. Additionally, if token stitcher engine 520 is processing T1 and F6 is also asserted in addition to F1, then the procedure identified by key 538 will also be performed in addition to the procedure identified by key 536. If token stitcher engine 520 is processing T1 and F6, but not F1, is asserted, then the procedure identified by key 538 will be performed, but the procedure identified by key 536 will not be performed.

Any number of tokens may be referenced by keys of hash table 534, including zero tokens up to all tokens handled by token stitcher 500. For example, in the example of FIG. 8B, for purposes of providing a clear explanation, only three tokens (T1, T2, and T3) are identified by or correspond to keys of hash table 534; however, other embodiments may comprise keys that identify or correspond to any number of tokens processed by token stitcher 500. Also, keys of hash table 534 may identify or correspond to any amount of flags in association with each token. For example, if flag bank 540 has 128 flags, then there may be many keys (for example, 5,000) in hash table 534 that identify or correspond to a token and one of the flags in flag bank 540. However, only the keys associated with an activated flag in flag bank 540 will trigger a hash table lookup.

As used herein, the term "hash table lookup" refers to the act of accessing mapping 532 (such as hash table 534 for example) to identify a procedure that token stitcher 500 should use to process a token received by token stitcher 500. For example, token stitcher engine 520 may determine that an activated flag in flag bank 540 triggers a hash table lookup.

In an embodiment, when token stitcher engine 520 processes a token (the "current token") for which mapping 532 (of which hash table 534 is an example) should be consulted to identify a procedure to process the current token, token stitcher engine 520 consults each flag in flag bank 540 to determine whether each flag is activated. Identifying which flags in flag bank 540 are activated may be referred to as "iterating through the active flags." For each flag in flag bank 540 that is activated while iterating through the active flags, a hash table lookup is performed using the current token and the activated flag as the basis for the key. If the key is present in hash table 534, then the resulting entry will identify the procedure which should be performed to process the current token. Note that even though a flag is activated in flag bank 540, there is no guarantee that a key based on the current token and that activated flag will be part of hash table 534.

To illustrate an example, assume that flag bank 540 contains 128 flags. If token stitcher engine 520 determines that a token T45 should be processed using hash table 534, then token stitcher engine 520 will consult flag bank 540 to determine which flags in flag bank 540 are activated. Assume that 30 flags in flag bank 540 are activated. Thereafter, token stitcher engine 520 will check if a key based on T45 and each of the 30 activated flags is present in hash table 534. For each key that is present in hash table 534, token stitcher engine 520 will use the procedure identified by the key in hash table 534 to process T45. Once a procedure is identified using hash table 534, the procedure may be performed before the hash table 534 is checked using a different key.

Mapping 532 (of which hash table 534 is an example) may be cached. Consequently, repeat operations involving the same key may be performed relatively fast. For example, if token stitcher engine 520 repeatedly processes the same token, then hash table lookups involving keys for that token may be cached to expedite processing of the procedures referenced by hash table 534.

According to one approach, when hash table 534 is successfully consulted, an address of a program in program memory 530 is obtained. According to another approach, when hash table 534 is successfully consulted, rather than receiving an address of a program in program memory 530, a token identifier is obtained, and then the process, described above with reference to FIG. 6, of resolving a token identifier to a program is performed.

As discussed above, not all activated flags in flag bank 540 will result in a "hit" in hash table 534. Indeed, it is observed that, in practice, most lookups in hash table 534 will fail. Thus, in an embodiment, token stitcher engine 520 may perform actions directed towards ignoring activated flags in flag bank 540 which are not relevant to a particular token. Said differently, token stitcher engine 520 may perform actions directed towards filtering out lookups to hash table 534 which will not succeed.

The regular expression compiler may, at compile time, determine a flag identifier associated with each flag in flag bank 540 and a cancel mask associated with each token. A flag identifier is a series of bits that uniquely identifies a flag in flag bank 540. A cancel mask is a ternary pattern which is intended to be compared to a flag identifier. If a cancel mask to a token matches the flag identifier of an activated flag, then that activated flag triggers a hash table lookup in hash table 534.

To illustrate, consider Example 1 of FIG. 9, which depicts several examples involving a cancel mask in accordance with some embodiments. For example, if the flag identifier of F1 is "1101," and cancel mask M1 is "1101," then a comparison of the two would result in a match. On the other hand, cancel mask M2="1001" does not match the flag identifier "1101" of F1.

Certain embodiments may employ a "don't care" operator (*) in the cancel mask. Consider Example 2 of FIG. 9. As shown in Example 2, cancel mask M3="1**0." The "don't care" operator (*) specifies that the value of that position is not involved in the comparison, and thus, cancel mask M3 matches flag F2, which has a value of "1110," and matches flag F3, which has a value of "1000," but cancel mask M3 would not match flag F3, which has a value of "1001."

Note that while each flag identifier and cancel mask depicted in FIG. 9 is 4 bits long, flag identifiers and cancel masks may be of any length, e.g., certain embodiments have employed cancel masks of 11 bits in length. For example, in an embodiment employing a 22-bit flag identifier and an 11-bit cancel mask, the compiler may compare the cancel mask to the first 11 bits of the flag identifier. In such an embodiment, the 11 bits of the cancel mask may be extended to 22 bits may adding don't care operators (*) to the cancel mask to extend its length to 22 bits.

The regular expression compiler may instruct token stitcher engine 520 on which cancel mask to use for each token that requires a hash table lookup. In an embodiment, the flag identifier may be the name of the flag itself. If there is a difference in the number of bits between a flag identifier and a cancel mask, then the most significant bits of the flag identifier and the cancel mask may be compared. There may be some practical limits on how much filtering can be accomplished using a cancel mask by certain embodiments; however, preventing most false positives from triggering a hash table lookup still results in a significant computational savings.

Many tokens are processed in similar manners. For example, the processing of many tokens may involve checking to see if one flag is set (or activated), and if so, then setting another flag. To advantageously minimize the size requirements of program memory 530, certain embodiments may factor out the common functionality performed for number of tokens so it can be handled by a single procedure or program.

To illustrate, consider the following functions performed by programs associated with various tokens according to some embodiments.

Token T1's program=if F0 set F10

Token T2's program=if F1 set F11

Token T3's program=if F2 set F12

Token T4's program=if F3 set F13

In this example, the program for T1 checks if flag F0 is set, and if so, the program sets flag F10, the program for T2 checks if flag F1 is set, and if so, the program sets flag F11, and so on. The functions performed by these programs may be generalized to be expressed as:

Token $T_i$'s program=if $F_{i-1}$ set $F_{i+9}$

By factoring out common functionality in this manner program, a single program (referred to herein as a class program) may be used to process many (for example, 10,000) tokens with appropriate compiler support.

Token identifiers may be a variety of different lengths, although for the sake of providing a concrete example, assume that a token identifier is 22 bits in length. For a 22 bit token identifier, the first 6 bits may identify a class (one of 64 classes) that is associated with a class program. The remaining 16 bits in the token identifier may be used to identify another program (referred to herein as a token program) which performs functionality specific to that token. With the remaining 16 bits left within a token identifier, 65,536 different token programs may be uniquely identified.

Initially, if a token is associated with a class program, then the class program is caused to be executed by token stitcher engine 520. If there is not a class program associated with a token being processed, then token stitcher engine 520 causes a token program to be executed to process the token. In processing a single token, token stitcher engine 520 may cause class program associated with the token to be executed and thereafter may cause a token program for the token to be executed.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense. For example, although specific embodiments of the DFA engine 221, NFA engine 222, and token stitcher 223 are discussed above, each can be implemented in hardware, in software, or as a combination of both hardware and software.

The present embodiments can be provided as a computer program product, or software, that may include a machine-readable medium having stored thereon instructions. The machine readable medium may be used to program a computer system (or other electronic devices) to generate articles (e.g., wafer masks) used to manufacture embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

The machine readable medium may store data representing an integrated circuit design layout that includes embodiments of the present invention. The design layout for the integrated circuit die may be generated using various means, for examples, schematics, text files, gate-level netlists, hardware description languages, layout files, etc. The design layout may be converted into mask layers for fabrication of wafers containing one or more integrated circuit dies. The integrated circuit dies may then be assembled into packaged components. Design layout, mask layer generation, and the fabrication and packaging of integrated circuit dies are known in the art; accordingly, a detailed discussion is not provided.

What is claimed is:

1. A token stitcher for determining whether an input string of characters matches a regular expression comprising a number of sub-expressions, the token stitcher comprising:
an input line for receiving tokens, where each token indicates a partial match between the input string and the regular expression;
a flag bank storing a number of flags, where each flag, when activated, identifies one or more of the sub-expressions that match the input string;
a program memory storing a number of programs, where each program comprises instructions for processing one or more tokens;
a token stitcher engine, coupled to a deterministic finite state automaton (DFA) engine and a non-deterministic finite state automaton (NFA) engine which are external to the token stitcher engine, configured to process the tokens generated from the DFA engine or the NFA engine and identify one or more programs stored in the program memory that are associated with a new token received over the input line, wherein the token stitcher engine is implemented by at least one processor-based computing device; and
an output line upon which an output match signal may be asserted,
wherein a particular program in the program memory is configured to assert the output match signal on the output line when a particular set of flags in the flag bank are asserted.

2. The token stitcher of claim 1, wherein the token stitcher engine uses a hash table to identify the one or more programs that are associated with the new token received over the input line, and wherein the hash table is constructed by a compiler that compiles the regular expression.

3. The token stitcher of claim 1, further comprising:
a hash table that maps each of set of tokens to one or more programs in the program memory, wherein each token in the set of tokens is referenced by more than a predetermined number of regular expressions.

4. The token stitcher of claim 1, wherein the token stitcher engine is further configured to perform:
upon the token stitcher engine determining the new token has been received over the input line, the token sticker engine checking each flag in the flag bank to identify which flags in the flag bank are asserted.

5. The token stitcher of claim 4, wherein the token stitcher engine is configured to identify which programs are associated with the new token received over the input line by performing:
upon the token stitcher engine identifying which flags in the flag bank are asserted, the token stitcher engine consulting a hash table to determine if any of a set of keys are mapped, by the hash table, to associated values.
wherein each key in the set of keys is associated with a different asserted flag in the flag bank.

6. The token stitcher of claim 5, wherein each of the set of keys identifies or corresponds to:
the new token received over the input line, and
one of the asserted flags in the flag bank.

7. The token stitcher of claim 5, wherein each of the associated values identifies or corresponds to a program stored in the program memory.

8. The token stitcher of claim 5, wherein the token stitcher engine consulting a hash table comprises:
the token stitcher engine consulting the hash table to determine if a first key is mapped by the hash table to a first associated value that identifies or corresponds to a first program;
the token stitcher engine causing the first program to be executed; and
after the first program is executed, the token stitcher engine consulting the hash table to determine if a second key is mapped by the hash table, to a second associated value that identifies or corresponds to a second program.

9. The token stitcher of claim 1, wherein the values of all the flags in the flag bank are associated with a single input stream.

10. The token stitcher of claim 1, wherein the token stitcher engine is further configured to:
save the current values of all the flags in the flag bank, wherein the current values of all the flags are associated with a first input stream; and
reset the values of all the flags in the flag bank to a prior state associated with a different input stream than the first input stream.

11. The token stitcher of claim 1, Wherein the token stitcher engine is configured to determine whether certain keys, of a set of keys, are present in a mapping, which associates keys to programs, when identifying the one or more programs that are associated with the new token,
wherein each of the set of keys is associated with a flag, in the flag bank, that is asserted, and
wherein the token stitcher engine is further configured to identify particular keys, in the set of keys, which need not be checked in the mapping.

12. The token stitcher of claim 1, wherein the token stitcher engine uses a hash table to identify the one or more programs that are associated with the new token, wherein each flag in the flag bank is associated with or comprises one or more bits that indicate whether the flag is present within the hash table.

13. The token stitcher of claim 1, wherein each flag in the flag bank is associated with or comprises a flag identifier comprising two or more bits, wherein each token is associated with a cancel mask comprising a plurality of bits, and wherein the token stitcher engine is configured to compare the cancel mask of the new token to the flag identifier associated with each asserted flag in the flag bank to identify the one or more programs, stored in the program memory, that are associated with the new token.

14. The token stitcher of claim 13, wherein the token stitcher engine is configured to compare the cancel mask of the new token to the flag identifier associated with each asserted flag to identify which keys should be used in consulting a hash table to identify the one or more programs.

15. The token stitcher of claim 13, wherein the cancel mask is a ternary number which matches the flag identifier of two or more flags in the flag bank.

16. The token stitcher of claim 1, wherein the token stitcher engine identifies the one or more programs by identifying a class program associated with the new token, and wherein the class program comprises instructions for processing two or more tokens of a class of tokens.

17. The token stitcher of claim 16, wherein the new token is associated with a token identifier, wherein the token stitcher engine identifies the class program based on a first portion of the token identifier, and wherein the class program describes a common functionality to be performed in processing a plurality of tokens.

18. The token stitcher of claim 17, wherein the token stitcher engine identifies a token program based on a second portion of the token identifier, and wherein the token stitcher engine causes the token program to be executed after the class program has been executed.

19. The token stitcher of claim 17, wherein the class program is identified by the token identifier based on a class identified by the first portion of the token identifier; and an offset into memory that is based on the identity of the new token.

20. The token stitcher of claim 1, wherein, for each activated flag in the flag hank, the token stitcher identifies a begin offset and an end offset in the input string, wherein the begin offset identifies, in the input string, the beginning of a sub-expression associated with the activated flag, and wherein the end offset identifies, in the input string, the end of the sub-expression associated with the activated flag.

21. The token stitcher of claim 1, wherein, for each activated flag in the flag bank, the token stitcher identifies a location of a first occurrence of a sub-expression associated with the activated flag in the input string.

22. The token stitcher of claim 1, wherein, for each activated flag in the flag bank, the token stitcher identifies a location of a last occurrence of a sub-expression associated with the activated flag in the input string.

23. The token stitcher of claim 1, wherein, for each activated flag in the flag bank, the token stitcher identities a location of all occurrences of a sub-expression associated with the activated flag in the input string.

24. The token stitcher of claim 1, wherein a certain program in the program memory comprises instructions for determining whether the new token matches a sub-expression of the regular expression based on offset information associated with the new token.

25. The token stitcher of claim 1, further comprising:
a compiler that divides each regular expression into one or more unique sub-expressions, wherein each sub-expression is assigned to the corresponding token.

26. The token stitcher of claim 1, wherein the token sticker engine is further configured to implement unbounded sub-expressions without maintaining an active state of DFA or NFA engines or utilizing resources of the DFA or NFA engines.

27. The token stitcher of claim 1, wherein the DFA engine directly triggers the NFA engine in a pipelined manner in response to an asserted trigger signal.

28. The token stitcher of claim 1, wherein the token stitcher engine processes the tokens generated from the DFA or NFA engines in the same order as the input characters in the input string that resulted in their generation, so that the token stitcher engine does not need to re-order the tokens generated from the DFA or NFA engines.

29. A token stitcher for determining whether an input string matches a regular expression comprising a number of sub-expressions, comprising:
a results component that maintains data identifying which sub-expressions match the input string;
a plurality of programs, where each program comprises instructions for processing one or more tokens received by the token stitcher, where each token indicates a partial match between the input string and the regular expression; and
an engine, coupled to a deterministic finite state automaton (DFA) engine and a non-deterministic finite state automaton (NFA) engine which are external to the engine, configured to process the one or more tokens generated from the DFA or the NFA and identify a program that is associated with a received token,
wherein a particular program of the plurality of programs is configured to assert an output match signal for the regular expression when the results are present in the input string and the engine is implemented by at least one processor-based computing device.

30. A token stitcher for determining whether an input string matches a regular expression comprising a number of sub-expressions, comprising:
means for maintaining data that identifies which sub-expressions match the input string;
means for maintaining programs for processing one or more tokens received by the token stitcher, where each token indicates a partial match between the input string and the regular expression; and
means for processing the tokens generated from a deterministic finite state automaton (DFA) engine or a non-deterministic finite state automaton (NFA) engine and identifying a program that is associated with a received token,
wherein the token stitcher, coupled to the DFA engine and the NFA engine which are external to the token stitcher, is configured to indicate a match for the regular expression when the means for maintaining data indicates that the sub-expressions in the regular expression are present in the input string.

\* \* \* \* \*

UNITED STATES PATENT AND TRADEMARK OFFICE
CERTIFICATE OF CORRECTION

PATENT NO.       : 8,589,405 B1
APPLICATION NO.  : 12/885176
DATED            : November 19, 2013
INVENTOR(S)      : Cristian Estan It is certified that error appears in the above-identified patent and that said Letters Patent is hereby corrected as shown below:

In the Claims

Column 19, line 48, please replace "each of set" with --each of a set--.
Column 20, line 18, please replace "hash table, to" with --hash table to--.
Column 20, line 31, please replace "claim 1, Wherein" with --claim 1, wherein--.

Signed and Sealed this
Fourth Day of March, 2014

Michelle K. Lee
*Deputy Director of the United States Patent and Trademark Office*